US010021546B2

(12) United States Patent
Collier

(10) Patent No.: US 10,021,546 B2
(45) Date of Patent: *Jul. 10, 2018

(54) METHOD AND SYSTEM FOR FAMILY PLAN SHARING OF WIRELESS SERVICES

(71) Applicant: TracFone Wireless, Inc., Miami, FL (US)

(72) Inventor: John Collier, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/702,995

(22) Filed: Sep. 13, 2017

(65) Prior Publication Data
US 2018/0007526 A1    Jan. 4, 2018

Related U.S. Application Data

(63) Continuation of application No. 15/049,318, filed on Feb. 22, 2016, now Pat. No. 9,769,642.
(Continued)

(51) Int. Cl.
*H04M 11/00* (2006.01)
*H04W 4/24* (2018.01)
*H04M 15/00* (2006.01)

(52) U.S. Cl.
CPC ............. *H04W 4/24* (2013.01); *H04M 15/09* (2013.01); *H04M 15/765* (2013.01); *H04M 15/80* (2013.01)

(58) Field of Classification Search
CPC ......... H04W 4/26; H04W 28/16; H04W 4/24; H04M 15/58; H04M 15/88; H04M 15/09;
(Continued)

(56) References Cited

U.S. PATENT DOCUMENTS 6,373,930 B1 * 4/2002 McConnell ........... H04M 15/88
379/114.17
7,154,380 B1   12/2006 Tarrab, Jr.
(Continued)

FOREIGN PATENT DOCUMENTS

WO    WO 2008027621 A1 *  3/2008  ............. G06Q 20/10
WO    WO 2009114876 A2 *  9/2009  ............. G06Q 20/10
(Continued)

*Primary Examiner* — Mahendra Patel
(74) *Attorney, Agent, or Firm* — Baker & Hostetler LLP

(57) ABSTRACT

A system and process of sharing a wireless surface allotment in a third party wireless network includes implementing a metering system to meter wireless service usage by users of the third party wireless network and tracking wireless usage by a plurality of wireless devices associated with the metering system. The system and process further includes receiving a share request to reallocate the respective wireless service allotment for at least two of the plurality of wireless devices, forwarding modification instructions to the metering system, requesting confirmation from the metering system that the modification instructions have been received, and modifying the respective wireless service allotments for the at least two wireless devices in response to receiving confirmation from the metering system.

18 Claims, 4 Drawing Sheets

Related U.S. Application Data

(60) Provisional application No. 62/118,738, filed on Feb. 20, 2015.

(58) Field of Classification Search
CPC .... H04M 15/765; H04M 15/80; G06Q 20/10; G06Q 20/12; G06Q 20/04; G06Q 20/02; H04L 12/1417; G04G 15/006
USPC ...... 455/406, 407, 405; 340/870.02, 870.01; 700/286
See application file for complete search history.

(56) References Cited

U.S. PATENT DOCUMENTS

| | | | |
|---|---|---|---|
| 7,676,423 B2* | 3/2010 | Avery | G06Q 30/00 705/35 |
| 9,305,310 B2* | 4/2016 | Radhakrishnan | G06Q 30/0283 |
| 2004/0060059 A1 | 3/2004 | Cohen | |
| 2007/0255653 A1* | 11/2007 | Tumminaro | G06Q 20/10 705/39 |
| 2008/0043404 A1 | 2/2008 | Frankel | |
| 2009/0164331 A1* | 6/2009 | Bishop | G06Q 20/02 705/19 |
| 2010/0027426 A1* | 2/2010 | Nair | H04W 28/16 370/238 |
| 2012/0197800 A1 | 8/2012 | Ross | |
| 2013/0226687 A1* | 8/2013 | Perry | G06Q 30/0233 705/14.33 |
| 2014/0128020 A1* | 5/2014 | Ramprasad | H04W 12/12 455/405 |
| 2014/0378092 A1* | 12/2014 | Bedingfield, Sr. | H04L 12/1417 455/405 |
| 2016/0072964 A1* | 3/2016 | Bedingfield, Sr. | H04L 12/1417 455/405 |

FOREIGN PATENT DOCUMENTS

| | | | | |
|---|---|---|---|---|
| WO | WO 2010060210 A1 * | 6/2010 | | G06Q 20/12 |
| WO | WO 2013126789 A1 * | 8/2013 | | G06Q 30/0233 |

* cited by examiner

METHOD AND SYSTEM FOR FAMILY PLAN SHARING OF WIRELESS SERVICES

CROSS REFERENCE TO PRIOR APPLICATIONS

This application is a continuation of the U.S. patent application Ser. No. 15/049,318, filed Feb. 22, 2016, now U.S. Pat. No. 9,769,642 issued Sep. 19, 2017, which is incorporated herein by reference in its entirety. This application also claims the benefit from U.S. Provisional Application No. 62/118,738 filed on Feb. 20, 2015, which is hereby incorporated by reference for all purposes as if fully set forth herein.

BACKGROUND OF THE DISCLOSURE

1. Field of the Disclosure

This disclosure relates generally to a process and system for implementing shared wireless service between two or more wireless users.

2. Related Art

Certain companies that provide wireless services, such as mobile phone service, can be wireless carriers or Mobile Network Operators (MNOs) that maintain, operate, and control their own wireless networks and typically have control of their own frequency spectrum. An MNO relies heavily on backend systems to address any provisional, billing, security, and data issues that might threaten the health of their networks.

MNOs use the backend system to provide shared wireless services. For example, current mobile shared plans include wireless service plans that allow subscribers to access a shared source of data or minutes and are allocated to the wireless user on a first-come first-serve basis. Alternatively, there exists shared wireless plans where a single user is allocated all the wireless services, i.e. parent device, and the services are allocated to wireless devices part of the shared plan, i.e. children devices.

A Mobile Virtual Network Operator (MVNO) is a mobile operator that typically does not own its own frequency spectrum and typically does not have its own network infrastructure. Instead, MVNOs have business arrangements and contracts with third party wireless carriers to purchase usage of their networks (e.g., minutes of voice calls, volume of data transfer, number of SMS, service days, etc.) that the MVNOs in turn sell to their own customers.

MVNOs utilize a number of different ways to meter wireless services to their customers including handset based metering, hybrid metering, and server based metering. In handset based metering of wireless services, the handset implements a secure model for metering, charging, and maintaining the wireless services. The handset maintains a software algorithm that typically meters the cellular subscriber's usage, and has some level of back-end control for provisioning and adding airtime to the line.

Hybrid metering utilizes a combination of the handset based metering and a server associated with the MNO in order for the MVNO to provide oversight for metering, charging, monitoring, and maintaining the wireless services. Server based metering relies on tracking information from the MNO in order for the MVNO to provide oversight for metering, charging, monitoring, and maintaining the wireless services. However, the handset based metering, hybrid metering, and server metering utilized by MVNOs is based on allocation of wireless service on a per wireless user basis (and for a predetermined time period) and this does not provide an effective approach to share various wireless services between two or more wireless users.

Accordingly, there is a need for a Mobile Virtual Network Operator (MVNO) to be able to allow two or more wireless users on individual wireless plans to share wireless service.

SUMMARY OF THE DISCLOSURE

The foregoing needs are met, to a great extent, by the disclosure, with a process and system for implementing wireless services that are shared between two or more wireless devices.

In one or more aspects, then process of sharing a wireless surface allotment in a third party wireless network, includes implementing a metering system to meter wireless service usage by users of the third party wireless network, tracking wireless usage by a plurality of wireless devices associated with the metering system, receiving a share request to reallocate the respective wireless service allotment for at least two of the plurality of wireless devices, forwarding modification instructions to the metering system, requesting confirmation from the metering system that the modification instructions have been received, and modifying the respective wireless service allotments based on an exchange rate for the at least two of the plurality of wireless devices in response to receiving confirmation from the metering system.

In another aspect, a wireless network provider system configured to share a wireless service allotment of a plurality of wireless devices in a third party wireless network includes a metering system configured to measure usage of wireless services of the third party wireless network by the plurality of wireless devices, the metering system being further configured to receive a share request to reallocate the respective usage allotment for at least two of the plurality of wireless devices, and the metering system being further configured to modify the respective usage allotments based on exchange rate for the at least two of the plurality of wireless devices in response to receiving confirmation from the at least two of the plurality of wireless devices.

There has thus been outlined, rather broadly, certain aspects of the disclosure in order that the detailed description thereof may be better understood herein, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be

DETAILED DESCRIPTION

Figure 1:
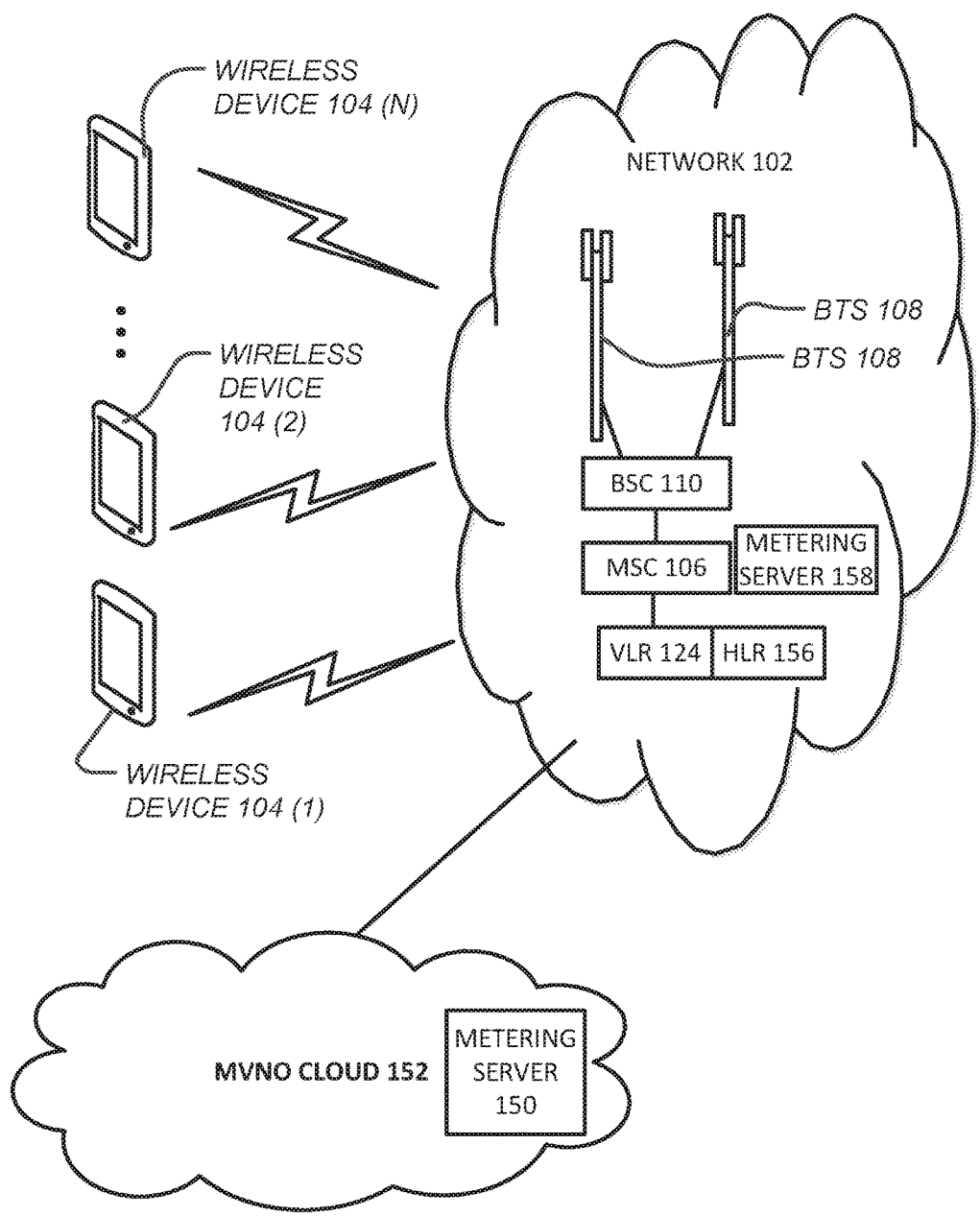
FIG. 1 shows a mobile network, a wireless device, and a mobile virtual network operator in accordance with aspects of the disclosure.

Reference in this specification to a "wireless device" is intended to encompass any compatible mobile technology computing device that connects to a wireless communication network, such as mobile phones, mobile equipment, mobile hotspots, wearable devices, mobile stations, user equipment, cellular phones, smartphones, handsets or the like (e.g., APPLE® IPHONE®, IPAD®, GOOGLE® ANDROID® based devices, BLACKBERRY® based devices, other types of PDAs or smartphones), wireless dongles, or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," "mobile hotspots," "wearable devices," or "phone." The term, "service plan" is intended to encompass any combination of voice, texts, data, and any non-data service provided to the wireless device. The terms, "shared plan," "business plan" and "family plan" are intended to encompass any service plan utilized by more than one device and any grouping of service plans that are owned by an entity such as a business entity. Further, reference in this specification to a "wireless network" or "network" is intended to encompass any type of wireless network from which a MVNO contracts with a MNO wireless carrier to provide mobile phone services through the use of a wireless device, such as the Global System for Mobile Communication (GSM) network, Code-Division Multiple Access (CDMA) network, 4G-LTE, 5G, or the like, that may utilize the teachings of the present application to allow a wireless device to connect to a wireless network.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

The following acronyms used herein will be defined as follows:
BSC—Base Station Controller
BTS—Base Transceiver Station
CDMA—Code-Division Multiple Access
ESN—Electronic Serial Number
GSM—Global System for Mobile communication
HLR—Home Location Register
ICCID—Integrated Circuit Card Identification
IMEI—International Mobile Equipment Identity
IMSI—International Mobile Subscriber Identity
Ki—Authentication Key
LAI—Local Area Identity
LTE—Long Term Evolution
MSC—Mobile services Switching Center
MMS—Multimedia Messaging Service
MVNO—Mobile Virtual Network Operator
OTA—Over-The-Air
SMS—Short Message Service
UICC—Universal Integrated Circuit Card or SIM
UMTS—Universal Mobile Telecommunications Service
VLR—Visitor Location Register The disclosure is a way for wireless users to share wireless services with family members by transferring unused wireless services between wireless devices. Any wireless device can request and send data, voice minutes, text messages, service days, or other features to other members. Transferring "service days," between any family members or shared plan members can be beneficial because this can prevent users from having their wireless service cut off. Furthermore, as this ability to share wireless services may be implemented with a MVNO, the sharing can be implemented across different carriers within a family plan.

FIG. 1 shows the details of a mobile network 102, a plurality of wireless devices 104(1)-104(n) (where n is any whole number), and a mobile virtual network operator (MVNO) cloud 152 in accordance with aspects of the disclosure. The disclosure may use a metering server 150 that may reside in the MVNO cloud 152 or may be stand-alone. The metering server 150 may be implemented as a server, computer, system, distributed processing system, cloud-based system or the like, or a plurality of the same. The MVNO cloud 152 may be implemented as a network, internet cloud, server, computer, system, distributed processing system, cloud-based system or the like. The metering server 150 may be responsible for one or more of provisioning, metering, and consolidating information for the wireless subscribers of wireless devices such as the wireless device 104. The metering server 150 may be configured to implement the further functionality as described in further detail below.

Alternatively or additionally, the disclosure may use a metering server 158 that may reside in the network 102. The metering server 158 may be implemented as a server, computer, system, distributed processing system, cloud-based system or the like, or a plurality of the same. The metering server 158 may be responsible for one or more of provisioning, metering, and consolidating information for the wireless devices such as the wireless device 104. The metering server 158 may be configured to implement the further functionality as described in further detail below.

Alternatively or additionally, the disclosure may utilize a tracking client 154 that may be associated with the wireless device 104. The tracking client 154 may be pre-installed or post-installed on the wireless device 104. The tracking client 154 may track usage of the wireless device 104. Moreover, the tracking client 154 may report usage information to the metering server 150. The tracking client 154 may be configured to implement the further functionality as described in further detail below.

When sharing wireless service, the respective tracking clients 154(1)-154(n) may track the usage of the corresponding wireless devices 104(1)-104(n) and/or the total usage of the wireless services. Alternatively or additionally, when sharing wireless service, the metering server 158 may track the usage of the corresponding wireless devices 104(1)-104(n) and/or the total usage of the wireless services. Alternatively or additionally, when sharing wireless service, the metering server 150 may track the usage of the corresponding wireless devices 104(1)-104(n) and/or the total usage of the wireless services.

In the following description, particular example is made of the wireless device 104, however, wireless devices 104(1)-104(n) may each include some or all of the elements/functionality described with respect to the wireless device 104. In one aspect, some or all of the wireless devices 104(1)-104(n) may be configured to share wireless service with some or all of the wireless devices 104(1)-104(n).

Figure 4:
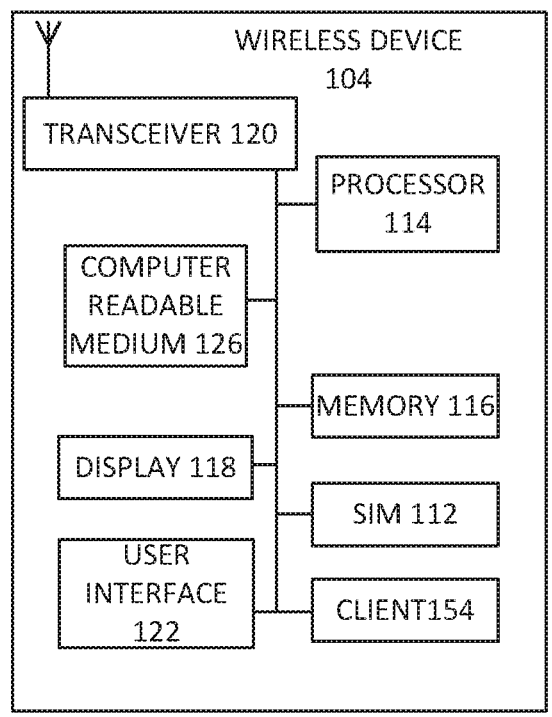
FIG. 4 shows the details of a wireless device in accordance with aspects of the disclosure.

FIG. 4 shows the details of a wireless device in accordance with aspects of the disclosure. As shown in FIG. 4, the wireless device 104 provides the radio and signal processing needed to access a network 102 for wireless services. The wireless device 104 includes a processor 114, memory 116, display 118, transceiver 120, user interface 122, computer readable medium 126, and the like as is known in the art. The processor 114 may be configured to process call functions, provide other services to the user, and may also execute any programs including the tracking client 154 if utilized in one of the particular aspects described herein.

It should be noted that the tracking client 154 may also be stored on or execute, at least in part, on a Subscriber Identification Module (SIM) or Universal Integrated Circuit Card (UICC) (Hereinafter generically referred to as a SIM 112), on dedicated hardware including semiconductors, application specific integrated circuits (ASIC), programmable logic arrays, the processor 114, and other hardware devices. The tracking client 154 may also execute partially or completely on the network 102 and/or any other network including any form of cloud computing and the like. The tracking client 154 may also execute partially or completely in the MVNO cloud 152.

In arrangements that use a SIM 112, the SIM 112 may be associated with the wireless device 104. The SIM 112 may be an integrated circuit that stores information and/or data such as an International Mobile Subscriber Identity (IMSI) and also may store a key used to identify and authenticate subscribers on the wireless device 104 and other devices. The SIM 112 may be configured to be transferred between different wireless devices. SIM 112 may also store network-specific information used to authenticate and identify subscribers on the network 102.

FIG. 1 further shows that the network 102 may include a Mobile services Switching Center (MSC) 106 that may perform the switching of calls and that may include a Visitor Location Register (VLR) 124. The network 102 may also include a Base Transceiver Station (BTS) 108 and a Base Station Controller (BSC) 110. The base transceiver station 108 houses the radio transceivers that define a cell and handle the radio-link protocols with the wireless device 104. The base station controller 110 manages the radio resources for one or more base transceiver stations 108. The base station controller 110 is the connection between the wireless device 104 and the Mobile service Switching Center (MSC) 106.

A Home Location Register (HLR) 156 and the VLR 124 together with the MSC 106, provide the call-routing and roaming capabilities. The HLR 156 contains all the administrative information of each subscriber registered in the corresponding network 102, along with the current location of the wireless device 104.

The above is an exemplary implementation of the network 102. Other types of networks utilizing other types of protocols may be implemented as well and are contemplated by the disclosure.

Figure 2:
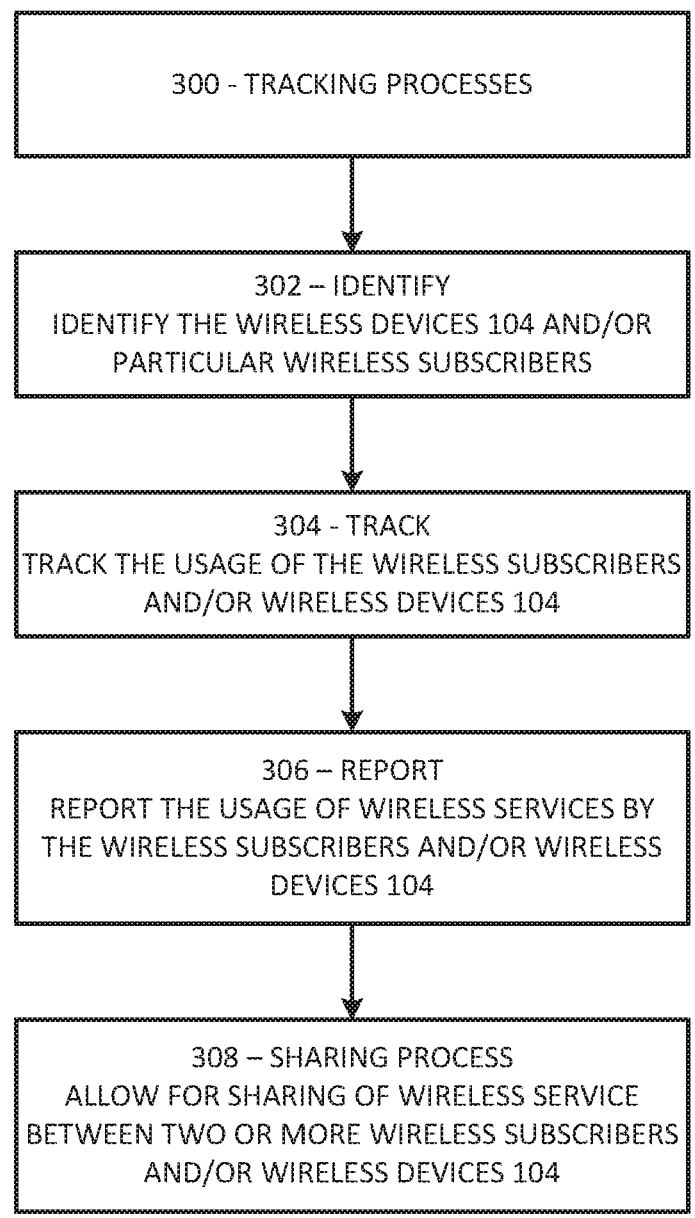
FIG. 2 shows tracking component processes in accordance with aspects of the disclosure.

FIG. 2 shows tracking component processes in accordance with aspects of the disclosure. As described above, the tracking client 154, the metering server 150, and/or the metering server 150 may operate to track wireless usage of the wireless devices 104(1)-104(n). For brevity, the tracking client 154, the metering server 150, and/or the metering server 150 will be referred to hereinafter as a tracking component.

In particular, the tracking component may implement processes to identify 302 the wireless device 104 and/or particular wireless subscriber; implement tracking processes 304 to track the usage of the wireless subscriber and/or wireless device 104; implement processes to report the usage of wireless services by the wireless subscriber using a reporting process 306; and implement processes to allow for sharing wireless services 308.

When two or more of the wireless devices 104(1)-104(n) are authorized to share wireless services, each of the wireless devices 104(1)-104(n) may initially operate to use wireless services consistent with a prepaid amount of wireless service purchased and allocated to each of the wireless devices 104(1)-104(n). Thereafter, according to the disclosure, portions of the wireless service may be shared among the wireless devices 104(1)-104(n) as further described below.

In a particular aspect, the tracking component may identify 302 the particular wireless subscriber and/or the wireless device 104 by providing identification information of the particular wireless subscriber and/or the wireless device 104 as shown by the process 300 in FIG. 2. In particular, the information may include network-specific information as required by the network. Additionally, the tracking component may provide specific information in order to provide the MVNO and/or the MVNO cloud 152 the ability to positively identify the wireless subscriber and/or wireless device 104. The network-specific information may include for example one or more of an Integrated Circuit Card Identification (ICCID), Electronic Serial Number (ESN), International Mobile Equipment Identity (IMEI), International Mobile Subscriber Identity (IMSI), Local Area Identity (LAI), and so on. Of course other types of information are within the spirit and scope of the disclosure.

The tracking component may also execute a tracking process 304 to track wireless usage in each of the wireless devices 104(1)-104(n). In particular, the tracking component may monitor the length of each voice call, the area code and/or the phone number that is placed based on the voice call, and the like. Additionally, the tracking component may monitor the amount of data that is sent or received by the wireless device 104. Moreover, the tracking component may monitor the number of SMS text messages or the like that are received or sent by wireless device 104. Additionally, the tracking component may monitor the number service days used or the like by the wireless device 104. Furthermore, any other type of usage of the wireless device 104 may be tracked for purposes of monitoring the wireless services. Additionally, for each of the above noted services provided to the wireless device 104, the further details of what network handled the services may also be tracked. Moreover, the date and time of the usage may be tracked as well.

Finally, the tracking component may also track any other aspect or usage of the wireless device 104 and accordingly these aspects are within the scope and spirit of the disclosure. This information or usage metric information that is accumulated based on the tracking of the above noted usage may then be stored in a secure location and/or stored in an encrypted manner to avoid the usage data from being compromised.

Additionally, the tracking process 304 may display the various metrics. For example, tracking process 304 may display the number of minutes of airtime used on the display 118 of the wireless device 104. Similarly, the tracking process 304 may also display the amount of data sent and received. Likewise the tracking process 304 may also display the amount of text messages sent and/or received. Finally, the tracking process 304 may also display the number of service days used. Moreover the tracking process 304 may provide a display of the amount of airtime, data, service days, and/or text messages that may be remaining from the previously purchased and/or credited amount of airtime, data, service days, and/or text messages. In other words, if a wireless user had purchased 100 min. of airtime and they used 70 min. of airtime, the tracking process 304 may display "30 min. of air time remaining." Additionally or alternatively, the tracking process 304 may display the current airtime, data, service days, and/or text messages used and/or remaining.

As shown in the reporting process 306, the tracking component may communicate the usage information to the metering server 150. The communication of the usage information to the metering server 150 may take place at predetermined times, after predetermined amounts of usage, in an ad hoc manner, or the like. For example, the tracking client 154 may communicate in response to a request from the metering server 150. The tracking client 154 may communicate with the metering server 150 and/or MVNO cloud 152 across one or more mediums to convey usage metrics information. In one or more aspects, the tracking client 154 may be configured to send activity reports, such as by SMS, MMS messages or the like, to the metering server 150.

For example, the wireless device 104 may send a SMS text message providing the usage metric information of the wireless device 104 to the metering server 150. The wireless device 104 can also send the usage metric information via e-mail, packet form, datagram, USSD messages or the like. If the wireless device 104 has Wi-Fi capability, the reporting process 306 may wait until the wireless device 104 connects to a Wi-Fi hotspot to send the information over the Internet.

In one or more aspects, a reporting SMS message may be sent with one or more of the following pieces of information: the IMEI; the ESN, the UICC ICC-ID; the length of each voice call, the total time of voice calls, the area code and/or the phone number that is placed based on the voice call; the amount of data that is sent and received; the total number of SMS text messages received and the total number of SMS text messages sent; and the date and time for each usage.

In one or more aspects, for such SMS reporting messages, the tracking client 154 may be configured to possess a destination address for the messages and a detail format (e.g., as provided by the MVNO or carrier) of the messages. In one aspect, the wireless device 104 SMS fields may be coded as a clear text ASCII comma separated value. The listing of parameters that may be reported may be stored securely in the wireless device 104 or on the SIM 112 (if utilized).

Alternatively or additionally, the metering server 158 may communicate in response to a request from the metering server 150. The metering server 158 may communicate with the metering server 150 and/or MVNO cloud 152 across one or more mediums to convey usage metrics information. In one or more aspects, the metering server 158 may be configured to send activity reports or the like, to the metering server 150.

As shown in the sharing process 308, the wireless device 104 user may communicate a request to share wireless service with another wireless device 104 user. The sharing process 308 may reallocate usage allotments of wireless services of the wireless devices 104(1)-104(n) that each utilize their own allocated wireless service. In particular, the sharing process may be initiated in response to a sharing request from a user. This request may be verified as coming from the user in any suitable manner. For example, an authentication procedure may be performed.

The sharing request may be initiated at one of the wireless devices 104(1)-104(n). In this regard, a user of one of the wireless devices 104(1)-104(n) may send a SMS text message to a particular address requesting transfer of voice minutes, data, text messages, and/or service days to another one of the wireless devices 104(1)-104(n). For example, the user may send the following text: "TRANSFER 5 SERVICE DAYS TO 3055551234." Thereafter, the sharing process 308 would transfer 5 service days to the one of the wireless devices 104(1)-104(n) having the phone number 3055551234. As another example, the user may send the following text: "TRANSFER 50 TEXT TO 3055551234." Thereafter, the sharing process 308 would transfer 50 text messages to the one of the wireless devices 104(1)-104(n) having the phone number 3055551234. A similar process could be utilized for data and voice minutes.

The sharing request may additionally or alternatively be initiated via the internet. In this regard, a user of one of the wireless devices 104(1)-104(n) may have an account with the MVNO that is accessible via webpage. This webpage Internet account may allow the user to login and transfer one or more of voice minutes, data, text messages, service days and the like to another user of one of the wireless devices 104(1)-104(n).

The sharing request may additionally or alternatively be initiated via a wireless device application implemented on one of the wireless devices 104(1)-104(n) by a user of one of the wireless devices 104(1)-104(n). This application may allow the user to login and transfer one or more of voice minutes, data, text messages, service days and the like to another user of one of the wireless devices 104(1)-104(n). The sharing request may additionally or alternatively be initiated via a service technician acting on behalf of the user, or the like. Other approaches to initiating a request to share wireless services are contemplated as well.

Figure 3:
FIG. 3 shows a sharing process in accordance with aspects of the disclosure.

FIG. 3 shows a sharing process in accordance with aspects of the disclosure. The metering component may execute the sharing process 308 as shown in FIG. 3. In general, this sharing process 308 is to reallocate usage allotment of the wireless devices 104(1)-104(n) that each utilize their own allocated wireless service. In particular, the sharing process may be initiated in response to the metering component receiving a sharing request from a user at step 510. This request may be verified as coming from the user in any suitable manner. For example, an authentication procedure may be performed. The request may be initiated at one of the wireless devices 104(1)-104(n), via the internet, via a service technician acting on behalf of the user, or the like as described above.

At step 512, the usage of all relevant wireless devices 104(1)-104(n) may be determined in order to determine if there is sufficient wireless service available for the request to be performed. The term, "relevant wireless devices 104(1)-104(n)" is to be understood to encompass all the wireless devices 104(1)-104(n) that might be affected by the request to share wireless service. In a particular example, with ten wireless devices 104-104i, if the user of one of these device wishes to share some portion of their wireless service to another user, then there may only be two relevant wireless devices out of the ten devices. The usage of wireless service of these relevant wireless devices 104(1)-104(n) may be determined by polling the tracking component or the respective tracking components of these relevant wireless devices 104(1)-104(n).

At step 514, it may be determined if the request is in compliance by comparing the share request to the wireless service allotment remaining in the relevant wireless devices 104(1)-104(n). For example, if the share request indicates 50 minutes of call time is to be transferred from the wireless device 104a to a wireless device 104b and the wireless device 104a has less than 50 minutes remaining, then the request would not be in compliance and the user would be informed at step 516 so that the user could revise the share request. If the share request is determined to be in compliance, the modification instructions can be pushed or forwarded to the relevant tracking component at step 518. In various examples, the modification instruction may be sent via data and/or non-data. Examples of non-data include SMS, premium SMS, and the like. Of note, in some aspects, the modification instruction alone is not sufficient to actually cause the modification to the wireless service allotment. In some examples, a confirmation is also sent at step 520 and the modifications are not stored to the tracking component until all confirmations have been received at step 522. It is an advantage of these examples that the wireless service allotment of one wireless device 104(1)-104(n) cannot be increased without also decreasing the wireless service allotment of another wireless devices 104(1)-104(n).

If confirmation is not received from the tracking component, an error procedure may be performed at step 524. The error procedure may include any suitable step or series of steps. In various examples, the error procedure may include resending the confirmation request, resending the confirmation request a predetermined number of times before cancelling the sharing instruction, resending the confirmation request using a different method (e.g., first via data, then via SMS or other non-data), informing the user of the confirmation failure and requesting they ensure the relevant wireless devices 104(1)-104(n) are powered on with sufficient reception to the network 102, and the like.

At step 526, the wireless service allotment may be modified according to the sharing instruction. For example, in response to all the confirmations being received, the respective tracking clients 154(1)-154(n) may be updated with the modified wireless service usage allotment. In another example, the metering server 150 may execute the sharing process 308. In particular, the metering server 150 may have the ability to modify the wireless service allotments for the relevant wireless devices 104(1)-104(n). The metering server 150 may modify the wireless service allotment in accordance with the sharing instruction. Thereafter, the sharing process 308 may modify any databases associated with respect to the usage allotment on wireless network and/or wireless user to ensure the correct charges for airtime, data, service days, and/or text messages are stored in the databases. In yet another example, the metering server 158 may have the ability to modify the wireless service allotments for the relevant wireless devices 104(1)-104(n). The metering server may modify the wireless service allotment in accordance with the sharing instruction. Thereafter, the sharing process 308 may modify any databases associated with respect to the usage allotment on wireless network and/or wireless user to ensure the correct charges for airtime, data, service days, and/or text messages are stored in the databases. Thereafter, the sharing process ends at 528.

A variation of the sharing process 308 may include a limitation on the times that voice minutes, data, text messages, service days and the like may be shared. For example, the sharing process 308 may only be implemented the last 10 days of a particular service month. Other time frames are contemplated as well. Similarly, the sharing process 308 may include a limitation on the number of times that voice minutes, data, text messages, service days and the like may be shared. Both of these limitations would reduce the likelihood of the system being over utilized.

A further variation of the sharing process 308 may include the ability for the user to share voice minutes, data, text messages, service days and the like within their own device. In other words, allow a user to carry over voice minutes, data, text messages, service days and the like to the next month through the sharing process 308.

A further variation of the sharing process 308 may include the ability to provide for a conversion rate when sharing voice minutes, data, text messages, service days and the like. In other words, if a user shares X text messages with another user, the cost will be Y text messages. With Y being greater than X.

A further variation of the sharing process 308 may include the ability to provide for a conversion to sharing voice minutes, data, text messages, service days and the like to another type of wireless service. In other words, if a user shares Z text messages with another user, the cost will be W voice minutes.

Accordingly, the disclosure is a way for wireless users to share wireless services with family members by transferring them between wireless devices. Any wireless device can request and send data, voice minutes, text messages, service days or other features to other members.

For the purposes of this disclosure a computer readable medium stores computer data, which data can include computer program code that is executable by a processor of the SIM or mobile device, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and nonremovable storage media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage media, magnetic cassettes, magnetic tape, magnetic disk storage or other magnetic storage devices, or any other physical or material medium which can be used to tangibly store the desired information or data or instructions and which can be accessed by a processor or computing device. In one or more aspects, the actions and/or events of a method, algorithm or module may reside as one or any combination or set of codes and/or instructions on a computer readable medium or machine readable medium, which may be incorporated into a computer program product.

In an aspect, the disclosure may be web-based. For example, a server may operate a web application to allow the disclosure to operate in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Additionally, the various aspects of the disclosure may be implemented in a non-generic computer implementation.

Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

In an aspect, the disclosure may be implemented in any type of mobile smartphones that are operated by any type of advanced mobile data processing and communication operating system, such as, e.g., an Apple iOS operating system, a Google Android operating system, a RIM Blackberry operating system, a Nokia Symbian operating system, a Microsoft Windows Mobile operating system, a Microsoft Windows Phone operating system, a Linux operating system or the like.

Further in accordance with various aspects of the disclosure, the methods described herein are intended for operation with dedicated hardware implementations including, but not limited to, PCs, PDAs, SIM cards, semiconductors, application specific integrated circuits (ASIC), programmable logic arrays, cloud computing devices, and other hardware devices constructed to implement the methods described herein.

While the system and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A process of sharing a wireless service allotment shared by a plurality of wireless users, the wireless service being provided by a third party wireless network, the process comprising the steps of:
   implementing a metering system to meter wireless service usage by users of the third party wireless network;
   tracking wireless usage by a plurality of wireless devices associated with the metering system;
   receiving a share request to the metering system from a user device to reallocate the respective wireless service allotment for at least two of the plurality of wireless devices;
   forwarding modification instructions to the metering system;
   requesting confirmation from the metering system that the modification instructions have been received; and
   modifying the respective wireless service allotments based on an exchange rate that modifies the respective wireless service allotments for the at least two of the plurality of wireless devices in response to receiving confirmation from the metering system,
   wherein the metering system is implemented at least in part in a network.

2. The process according to claim 1, wherein the modifying the respective wireless service allotments comprises modification instructions sent as data.

3. The process according to claim 1, wherein the modifying the respective wireless service allotments comprises modification instructions sent as non-data.

4. The process according to claim 1, wherein the metering system is further implemented in at least one of the plurality of wireless devices.

5. The process according to claim 1, wherein the metering system is further implemented at least in part in the third party wireless network.

6. The process of tracking usage of a wireless device according to claim 1 wherein the metering system is implemented in at least one of the plurality of wireless devices, the third party wireless network, and a network.

7. The process according to claim 1, wherein the receiving a share request comprises receiving a share request from a one of the plurality of wireless devices.

8. The process according to claim 1, wherein the receiving a share request comprises receiving a share request from an Internet-based account of one of the plurality of wireless devices.

9. The process according to claim 1, wherein the receiving a share request comprises receiving a share request from an application associated with one of the plurality of wireless devices.

10. A wireless system configured to share a wireless service allotment of a plurality of wireless devices, the wireless service allotment being provided by a third party wireless network comprising:
   a metering system configured to measure usage of wireless services of the third party wireless network by the plurality of wireless devices;
   the metering system being further configured to receive a share request from a user device to reallocate the respective usage allotment for at least two of the plurality of wireless devices; and
   the metering system being further configured to modify the respective usage allotments based on an exchange rate that modifies the respective wireless service allotments for the at least two of the plurality of wireless devices in response to receiving confirmation from the at least two of the plurality of wireless devices,
   wherein the metering system is implemented at least in part in a network.

11. The system according to claim 10, wherein the metering system is configured to modify the respective wireless service allotments in response to modification instructions sent as data.

12. The system according to claim 10, wherein the metering system is configured to modify the respective wireless service allotments in response to modification instructions sent as non-data.

13. The system according to claim 10, wherein the metering system is further implemented in at least one of the plurality of wireless devices.

14. The system according to claim 10, wherein the metering system is further implemented at least in part in the third party wireless network.

15. The system of tracking usage of a wireless device according to claim 10 wherein the metering system is implemented in at least one of the plurality of wireless devices, the third party wireless network, and a network.

16. The system according to claim 10, wherein the metering system is configured to receive a share request that comprises receiving a share request from a one of the plurality of wireless devices.

17. The system according to claim 10, wherein the metering system is configured to receive a share request that comprises receiving a share request from an Internet-based account of one of the plurality of wireless devices.

18. The system according to claim 10, wherein the metering system is configured to receive a share request that comprises receiving a share request from an application associated with one of the plurality of wireless devices.

* * * * *